INVENTOR:
BRIAN AINLEY.

United States Patent Office 3,360,700
Patented Dec. 26, 1967

3,360,700
TUBULAR TRIMMER CAPACITORS
Brian Ainley, Ulverston, England, assignor to Oxley Developments Company Limited, Ulverston, England, a British company
Filed Dec. 6, 1965, Ser. No. 511,955
Claims priority, application Great Britain, Dec. 15, 1964, 50,933/64
9 Claims. (Cl. 317—249)

This invention concerns tubular trimmer capacitors.

Tubular trimmer capacitors conventionally comprise a quartz tube having one end region externally metallized and the opposite end region closed by a metal bush by means of which the capacitor may be mounted in a working position, as by securing it to a chassis or other mounting surface. The bush and the metallized end of the quartz tube constitute the two terminals of such a capacitor, while the bush is additionally axially bored and threaded to receive a screw which extends axially into the tube and which, at its inner end, carries a metal piston forming a close sliding fit within the tube. By adjustment of the screw, the piston thus serves as the variable element of the capacitor, of which the quartz itself is the dielectric and the metallized end of the tube is the foxed element. Trimmer capacitors of such construction, however, are expensive in manufacture, not mechanically strong due to the relatively fragile nature of the quartz tube, and not entirely satisfactory as regards temperature coefficients since, for example, the tuning piston and the quartz metallizing are of dissimilar materials.

According to the present invention, a trimmer capacitor comprises a tubular outer casing having at least one metallic cylindrical surface, a piston member having a length of the same order as that of the outer casing and forming a close circumferential, axially displaceable fit in said outer casing, said piston member presenting at least one metallic cylindrical surface radially separated from the metallic surface of the outer casing, and cylindrical dielectric means in the space between said metallic cylindrical surfaces.

The outer casing and the piston may both be synthetic resin tubes having one or other of their cylindrical surfaces metallized to act as the two electrodes of the capacitor, the synthetic resin itself constituting the dielectric. For example, the outer casing may have a metallized exterior and a threaded interior for receiving a correspondingly externally threaded tube having a metallized interior cylindrical surface, the inner tube constituting the axially displaceable piston.

Yet again, the outer casing may be a metal tube receiving a synthetic resin piston having a metallized inner cylindrical surface, or alternatively a synthetic resin outer tube having a metallized outer cylindrical surface may receive a solid metal piston. Preferably, however, both the outer casing and the piston are wholly of metal and are radially separated by a sleeve of synthetic resin dielectric material.

Conveniently the capacitor is provided with a stirrup at one end, and a conductive pin-like extension at the other end of the outer casing, bent paralllel to the stirrup, whereby the capacitor may be mounted on a printed circuit board or the like, by passing the legs of the stirrup and the bent pin extension through holes in the printed circuit board, and soldering them in position. Whereas this method of mounting is particularly suitable for use with printed circuit boards and the like, it is not suitable for mounting the capacitor on a metal chassis or the like, and according to a preferred feature of the present invention a screw thread is formed along some or all of the length of the exterior surface of the tubular outer casing of the capacitor.

The capacitor is adapted thereby to be screwed into an internally threaded hole in a support member such as a mounting bracket or insulating block; or into a threaded hole in a metal chassis or the like.

Alternatively the capacitor may be passed through a hole in the support member, so that the threaded portion of the tubular outer casing extends on either side of the hole, and may be secured in place by nuts screwed onto the threaded portion one on each side of the hole, to grip the support member therebetween.

According to a particularly preferred embodiment of the invention, the tubular outer casing is formed with a screw thread along a portion of its otuer surface, this threaded portion extending between preipheral abutment or flange, formed at one end of the casing and a further section of the casing, having a diameter less than the intenral thread diameter of the threaded portion. The capacitor may be secured to a support member, by forming a circular hole in this member having a diameter which is large enough to allow the threaded portion to pass therebetween but is small enough to prevent the passage of the peripheral abutment or flange, passing the capacitor through this hole, so that the flange abuts the member on one side of the hole and screwing a nut onto the threaded portion to abut the member on the other side of the hole, so that the member is gripped between the flange and nut.

The peripheral abutment or flange is preferably formed with a hexagonal nut profile whereby it may be gripped by a spanner or similar tool.

The invention will be described further, by way of example, with reference to the accompanying drawings, in which:

FIG. 2 is a similar section of another embodiment, and with reference to the accompanying drawings, in which:

Figure 1:
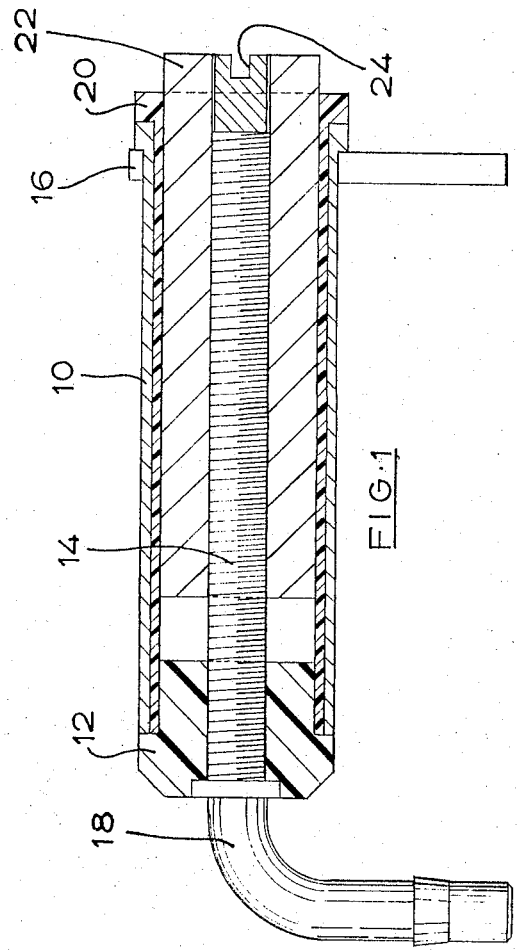
FIG. 1 is an axial section through one trimmer capacitor embodying the invention.

In the trimmer capacitor shown in FIG. 1, one end of an outer brass casing 10 is closed by an axially bored plug member 12 which supports a threaded rod 14 axially of the casing. One end of the casing 10 carries a stirrup 16 secured thereto, while at the opposite end, an unthreaded extension 18 of the rod 14 projects from the casing and is bent parallel to the stirrup 16. Within the casing 10 is tightly fitted a sleeve 20 of dielectric material, preferably polytetrafluoroethylene, while a brass piston or slug member 22 having an axial bore threaded to engage on the rod 14 is introduced into the open end of the assembly to form a close, slipping fit with the sleeve 20. The outer casing 10 thus constitutes the fixed electrode of a capacitor of which the movable electrode is the piston 22 and the dielectric is the sleeve 20, and the free end of the piston 22 is provided with a screwdriver slot 24 or equivalent means for adjustment purposes.

By virtue of the fact that the guide rod 14 is supported both by the plug member 12 and by the piston 22, while the latter, which will be seen to have a length substantially commensurate with that of the casing 10, is always firmly embraced by the sleeve 20 over a wide range of piston adjustment, a high degree of mechanical stability results The relatively fine nature of the thread on the rod 14 provides a high degree of tuning resolution, which is significantly assisted by the solid lubricant character of the dielectric sleeve when the latter is of the preferred or a similar material, while the use of a common metal for the outer casing and the piston produces valuable temperature coefficient characteristics.

The configuration illustrated of the mounting stirrup 16 and guide rod extension 18 is especially useful for mounting directly into a printed circuit board, but it will be appreciated that by providing instead, an extension which is an axial continuation of the rod 14, the capacitor may be mounted vertically, the stirrup 16 then being omitted if desired. Alternatively, the stirrup being retained as a mounting means, a straight axial extension of the rod 14 may be hollowed to act as a socket for receiving the inner conductor of a coaxial cable, the outer braiding of which may then be continued over and soldered directly to the casing 12.

Figure 2:
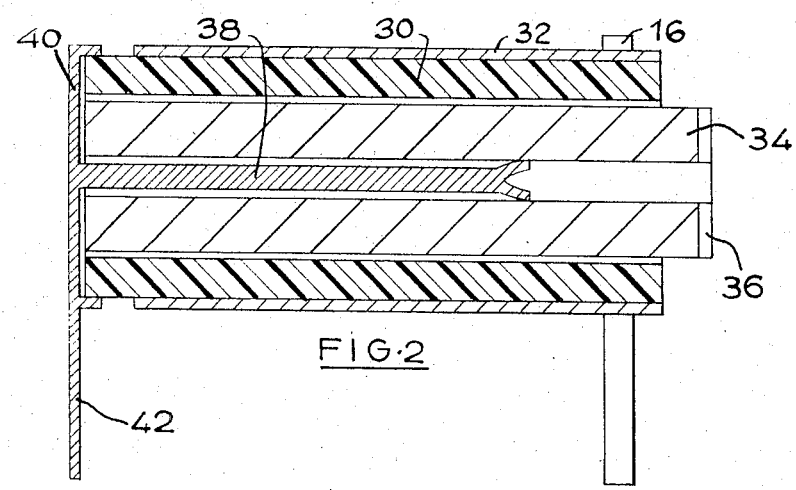

In the capacitor construction shown in FIG. 2, the wholly metal outer casing of FIG. 1 is replaced by a synthetic resin tube 30 having a metallized outer surface 32, to one end of which is secured a mounting stirrup 16. The internal cylindrical surface of the tube 30 is threaded to engage a threaded metal piston or slug member 34 having a screwdriver adjustment slot 36, and the piston 34 is axially bored to receive an axially extending wiper 38 carried by an end closure cap 40 having a radially directed mounting tab 42. The cap 40 is a bonded, driving or other fit on an unmetallized end region of the outer casing 30. While the temperature coefficient characteristics of a capacitor of this construction are not of the same high order as those of the preceding embodiment, the mechanical stability and mounting convenience are comparable, and the construction is less costly.

It will be appreciated that the construction of FIG. 2 may be modified, in that, for example, the inner cylindrical surface of the tube 30 may be metallized rather than its outer surface, and the piston may be a thin-walled synthetic resin tube also having a metallized inner surface, so that the thickness of the piston wall then constitutes the capacitor dielectric, while the capacitor has an electrically insulating outer surface.

Figure 3:
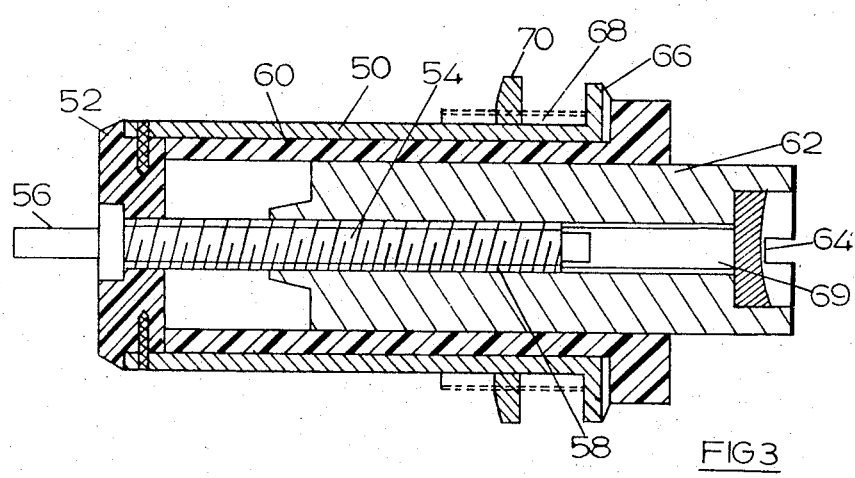
FIG. 3 is an axial section through a trimmer capacitor constructed as a further embodiment of the invention.
Figure 4:
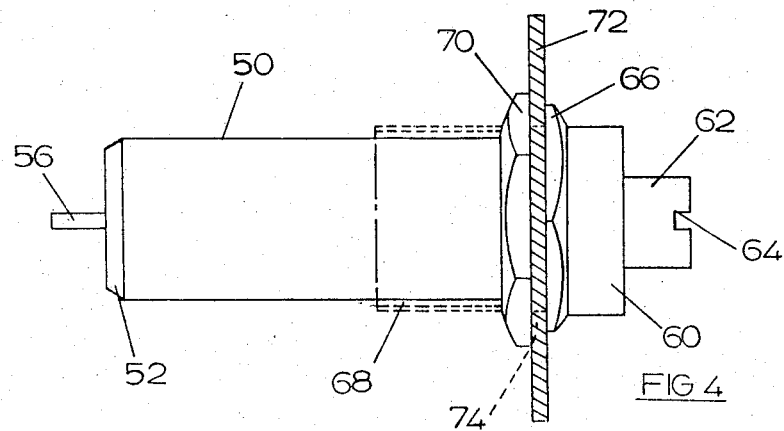
FIG. 4 illustrates this further embodiment mounted on a support member such as a metal chassis.

In a further embodiment, which is illustrated in FIGS. 3 and 4 of the accompanying drawings the capacitor is arranged for mounting on a support member such as a metal chassis, and comprises an outer, tubular metal casing 50, which is closed by an axially bored plug member 52, and a rod 54 is supported thereby axially of the casing. The rod 54 extends axially over substantially the whole length of the casing and extends through the plug member 52 to project axially from the casing to form a solder tag contact 56, that portion of the rod which lies within the casing being formed with a screw thread 58. A cylindrical sleeve 60 of dielectric material such as polytetrafluorethylene is tightly fitted within the casing 50, and a metal piston 62 (or slug member) having an axial bore 64, threaded to engage on the threaded portion 58 of the rod 54 is introduced into the open end of the casing assembly to form a close, slipping fit within the sleeve 60. The outer casing 50 thus constitutes the fixed electrode of a capacitor of which the movable electrode is the piston 62 and the dielectric is the sleeve 60, the free end of the piston 62 being provided with a screwdriver slot 64 or equivalent means for adjustment purposes.

The tubular metal outer casing 50 is formed at its open end with a peripheral abutment 66 having a hexagonal nut profile, and a portion 68 of the casing axially adjacent the radial abutment is formed with a screw thread, the diametral distance between flats on the hexagonal nut abutment being greater than the external thread diameter of the threaded portion 68. The threaded portion 68 extends over only a part of the length of the casing 50, and the remaining section of the casing has a diameter which is less than the internal thread diameter of the threaded portion 68, whereby a hexagonal nut 70 may be threaded onto the threaded portion 68 of the tubular outer casing 50.

As illustrated in FIG. 4, the capacitor may be secured to a support member 72 by forming a hole 74 (shown in dotted outline) in the support member having a diameter greater than the external thread diameter of the threaded portion 68 but less than the diameter distance between the flats of the hexagonal nut abutment 66, passing the capacitor through the hole 74, so that this abutment 66 is adjacent the support member 72 on one side end screwing the nut 70 on the threaded portion so that it abuts the support member 72 on the other side, and tightening the hexagonal nut on the threaded portion so that the support member is gripped tightly between the abutment and the hexagonal nut.

Figure 5:
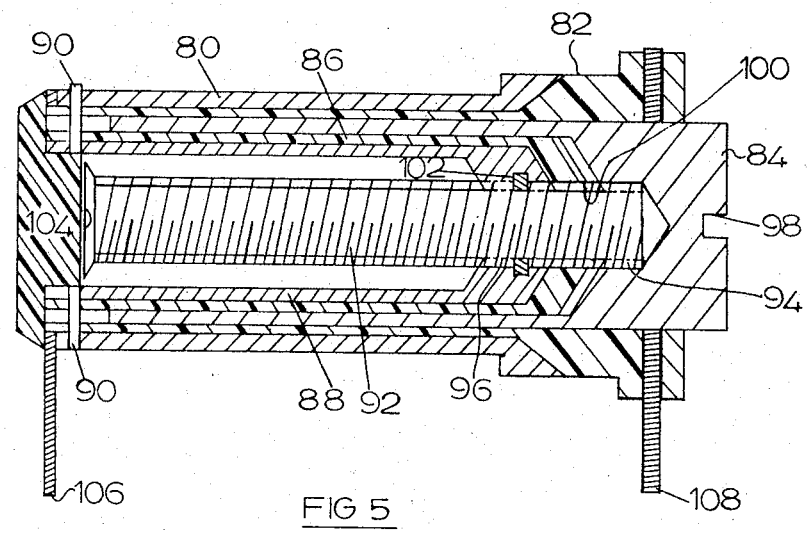
FIG. 5 illustrates a still further embodiment of the invention.

In order to increase the capacitance of a capacitor it is necessary either to increase the surface areas of plates of the capacitor or to increase the number of plates, and FIG. 5 of the drawings illustrates a tubular trimmer capacitor having two concentric tubular dielectric elements and an additional, internally mounted electrode element connected to the outer casing. The capacitor comprises a cylindrical metal outer casing 80 which serves as an outer electrode and has a cylindrical dielectric sleeve 82 fitted tightly within its cylindrical interior. A tubular metal piston member 84 which is closed at one end, forms a close slipping fit between the sleeve 82 and a second cylindrical dielectric sleeve 86, which is fitted tightly over an internal tubular metal electrode 88. The internal electrode is supported at one end in a plug member 104 fitted into, and serving to close, one end of the outer casing 80. The electrodes and dielectric sleeves are located by radially directed pins 90, and by forming the pins from electrically conductive material they additionally serve to electrically connect the internal electrode 88 to the outer casing 80. A portion of the internal surface of the inner electrode 88 is formed with a screw thread 96 to engage a correspondingly threaded interior of a rod 92 of electrically insulating material, which is screwed into an axial threaded bore in the closed end of the piston 84. A diametral slot 98 is formed in the end face of the piston 84, to receive a screwdriver blade or the like for rotating the piston relative to the outer casing, thereby to cause axial displacement of the piston into or out of the outer casing.

In order to prevent movement of the piston due to vibration or shock the dielectric sleeve 86 is preferably extended and formed with an axial bore 100 to fit closely around the threaded rod 92. Additionally or alternatively a friction ring 102 is fitted within the screw thread formed in the internal electrode, to engage the threads of the threaded rod 92.

Electrical contact elements 106 and 108 are arranged at opposed ends of the trimmer for contacting the outer casing 80 and metal piston 84 respectively the legs of the contact elements conveniently providing supporting lugs for mounting the capacitor for example on a printed circuit board or the like.

In a particularly preferred arrangement the dielectric elements are formed from polytetrafluorethylene and the threaded rod 92 is formed from a hard plastics, or like, insulating material.

I claim:

1. A tubular trimmer capacitor comprising: a tubular outer casing of synthetic resin material having a threaded cylindrical interior surface and a metallised external cylindrical surface, and a piston member also of synthetic resin material having a length of the same order as that of the outer casing and having a threaded cylindrical exterior surface engageable with the thread in the outer casing in a close circumferential axially displaceable fit in said outer casing, said piston member having at least one metallic cylindrical surface; at least one of the two surfaces, the interior of the outer casing and the exterior of the piston member, being a dielectric material.

2. A tubular trimmer capacitor according to claim 1 in which the piston is a tube having a metallized interior which constitutes said one metallic cylindrical surface.

3. A tubular trimmer capacitor comprising a tubular metal outer casing open at one end and closed at the other by an axially bored plug member of electrically insulating material, a metal rod threaded over at least a part of its length and passing through the bore in the plug member to extend axially of the outer casing, a cylindrical sleeve of synthetic resin dielectric material fitted within said outer casing, a cylindrical metal piston member formed with an axial threaded bore to engage the threaded portion of the rod and forming a close slipping fit within the sleeve, a U-shaped stirrup, the open end of the outer casing being secured within the crown portion of the stirrup, and an unthreaded portion of the metal rod extending through the plug member and being bent parallel to the limbs of the stirrup, the bent portion of the rod and the two limbs of the stirrup constituting three mounting and connecting lugs for mounting the capacitor on a printed circuit board or the like.

4. A tubular trimmer capacitor according to claim 3 in which the synthetic resin dielectric material is polytetrafluorethylene.

5. A tubular trimmer capacitor comprising a tubular metal outer casing open at one end and closed at the other by an axially bored plug member of electrically insulating material, a metal rod threaded over at least a part of its length and passing through the bore in the plug member to extend axially of the outer casing, a cylindrical sleeve of synthetic resin dielectric material fitted within said outer casing, a cylindrical metal piston member formed with an axial threaded bore to engage the threaded portion of the rod and forming a close slipping fit within the sleeve, an unthreaded portion of the metal rod extending through the plug member to form an electrical connection to the metal piston and a screw thread formed along at least a part of the length of the exterior of the outer casing.

6. A tubular trimmer capacitor according to claim 5 in which the threaded portion extends between a peripheral abutment which is formed in the outer casing and has a hexagonal nut profile, and a further section of the outer casing which has a diameter less than the internal thread diameter of the threaded portion.

7. A tubular trimmer capacitor comprising a tubular metal outer casing which serves as an outer electrode and is open at one end and is closed at the other by a plug member of electrically insulating material, an inner electrode electrically connected to the outer electrode and comprising a metal tubular member having a screw thread formed in at least a portion of its internal surface and supported concentrically within the outer casing by the plug member, a first cylindrical sleeve of synthetic resin dielectric material fitted within the outer casing and radially separated from a second similar sleeve, fitted around the inner electrode, and a tubular metal piston member which is closed at one end, forming a close slipping fit between the two sleeves and a threaded rod of electrically insulating material which is secured at one end to the closed end of the piston member and is arranged coaxially therewithin to engage in the threaded portion of the inner electrode.

8. A tubular trimmer capacitor according to claim 7 in which at least one of the sleeves is formed from polytetrafluorethylene.

9. A tubular trimmer capacitor according to claim 8 in which a screw thread is formed along at least a part of the length of the exterior of the outer casing.

References Cited
UNITED STATES PATENTS

| | | | |
|---|---|---|---|
| 2,516,981 | 7/1950 | Hall | 317—249 |
| 2,927,601 | 3/1958 | Gamzon | 317—249 |
| 3,239,730 | 3/1966 | Farago | 317—249 |

FOREIGN PATENTS

| | | |
|---|---|---|
| 584,251 | 11/1924 | France. |
| 710,444 | 6/1954 | Great Britain. |
| 865,462 | 4/1961 | Great Britain. |

LEWIS H. MYERS, *Primary Examiner.*

LARAMIE E. ASKIN, *Examiner.*

E. GOLDBERG, *Assistant Examiner.*